(No Model.)
T. H. HAWTHORNE.
TWO WHEELED VEHICLE.
No. 269,285. Patented Dec. 19, 1882.
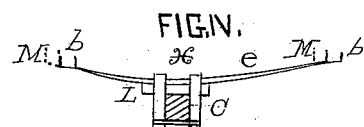
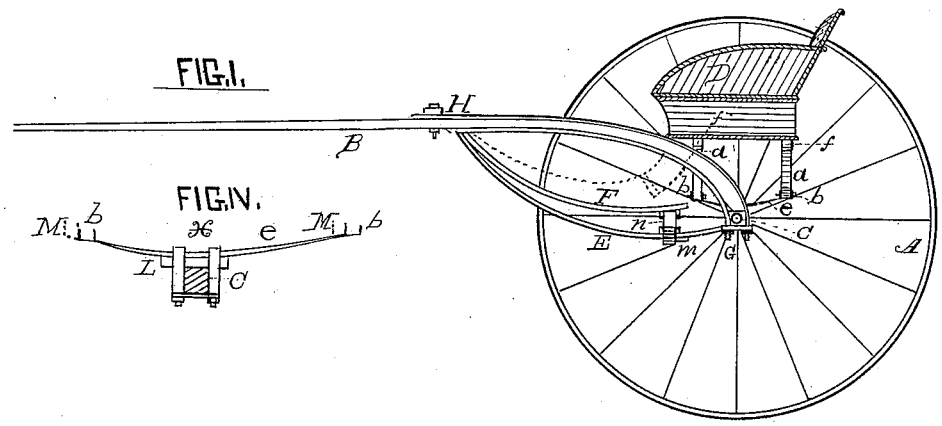
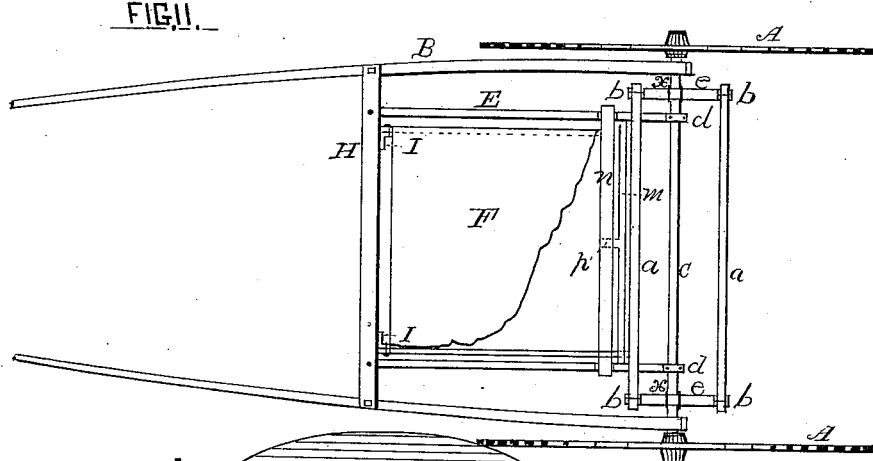
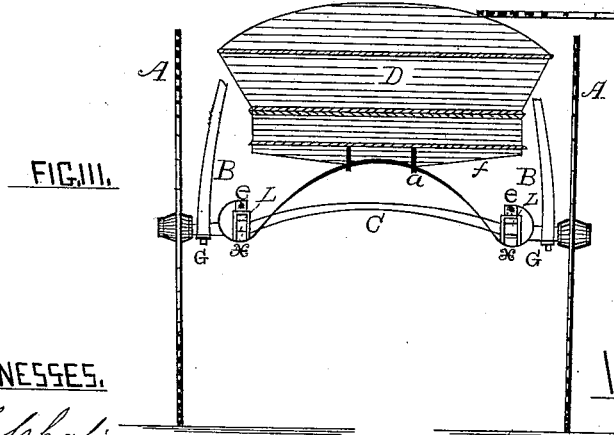
WITNESSES.
G. L. Chapin
J. S. Huey
INVENTOR.
Thomas H. Hawthorne

United States Patent Office.

THOMAS H. HAWTHORNE, OF MENDOTA, ILLINOIS.

TWO-WHEELED VEHICLE.

SPECIFICATION forming part of Letters Patent No. 269,285, dated December 19, 1882.

Application filed September 18, 1882. (No model.)

*To all whom it may concern:*

Be it known that I, THOMAS H. HAWTHORNE, of Mendota, in the county of La Salle and State of Illinois, have invented new and useful Improvements in Two-Wheeled Vehicles, of which the following is a specification, reference being had to the accompanying drawings, illustrating the invention, in which—

Figure I is a longitudinal elevation of a two-wheeled vehicle with one wheel removed embodying my invention; Fig. II, a plan or top view of Fig. I, except that both wheels are on the axle-tree and the box removed; Fig. III, a rear view of the vehicle; Fig. IV, a cross-section of the axle-tree with a transverse spring mounted thereon.

The object of the present invention is to make a stronger, simpler, cheaper, and easier riding two-wheeled vehicle or cart than is now produced for the same cost.

The nature of the present invention consists, first, in two-wheeled vehicles in which the foot-board is hung to swing between the braces connecting the axle tree with the cross-bar on a spring interposed between the foot-board and braces, in combination with stop-pins below the foot-board to prevent too great depression of the foot-board when a person is standing thereon; second, in two-wheeled vehicles where the box and foot-board have separate supports, long springs lying parallel with the axle-tree and on opposite sides thereof, in combination with short springs lying transversely on the axle-trees, with braces to connect the axle-tree with the thill-bar and foot-board springs, whereby the seat and foot-board have independent movement, and are so connected together that an easy-riding, durable, and stylish sulky is obtained.

A A are the wheels, B the thills, C the axle-tree, of the ordinary two-wheeled cart; and H is the cross-bar connecting the thills in the usual manner. The thills are held to the axle-tree C by clips G and the braces E by clips $d\ d$, Fig. 2, the forward ends of the braces being secured to the cross-bar H by bolts or otherwise, so as to be rigid to it. The braces E have a downward curve somewhat like the upward curve to the thills; and to the braces, by suitable jaws, is attached the foot-board spring $n$, it being in a position, when depressed, to bear on the stop $p$ of a bar, $m$, which at its ends is secured to the braces E. The rear end of the foot-board F is supported by the spring $n$, and its forward end is jointed to the cross-bar H at I I, as shown at Fig. 2.

The support for the seat D consists of springs $e\ e$, placed on bearers L, Figs. 3, 4, transversely to the axle-tree C, and held in place by clips $x\ x$, which, by being loosened, permit the springs to be adjusted longitudinally, as shown by dotted lines M, to put more or less weight on the horse's back. By means of ordinary connecting-lug, $b$, long springs $a\ a$ are attached to the short springs $e\ e$, and to these long springs the bearers $f$ to the box or seat D are attached in the usual manner. From this it will be seen that the seat and foot-board are wholly detached, and are operated on by independent springs, and that the seat has its only support on the axle-tree C by means of the interposed platform-springs.

I claim as new and desire to secure by Letters Patent—

1. In two-wheeled vehicles, the foot-board F, hung to swing between the braces E and to bear on a spring, $n$, interposed between the foot-board and the braces E, in combination with the stop $p$ and bar $m$, as and for the purpose specified.

2. In two-wheeled vehicles where the box and seat have separate supports, the long springs $a\ a$, lying parallel with the axle-tree C and on opposite sides thereof, in combination with the short springs $e$, axle-tree C, braces E, springs $n$, and foot-board F, as and for the purpose specified.

THOMAS H. HAWTHORNE.

Witnesses:
   G. L. CHAPIN,
   J. S. HUEY.